United States Patent [19]

Li

[11] 4,230,529

[45] Oct. 28, 1980

[54] DISTILLATION APPARATUS

[76] Inventor: Yao T. Li, Huckleberry Hill, Lincoln, Mass. 01773

[21] Appl. No.: 961,452

[22] Filed: Nov. 16, 1978

[51] Int. Cl.[2] .............................................. B01D 3/04
[52] U.S. Cl. .................................... 202/175; 202/236; 203/26; 159/17 P; 159/7; 159/13 A; 159/25 A
[58] Field of Search ..................... 202/238, 236, 175; 159/7, 11 A, 25 R, 13 A, 25 A, 17

[56] References Cited

U.S. PATENT DOCUMENTS

| 2,884,050 | 4/1959 | Brownell | 159/11 A |
| 2,894,879 | 7/1959 | Hickman | 202/236 |
| 3,190,817 | 6/1965 | Neugebauer et al. | 202/236 |

*Primary Examiner*—Norman Yudkoff
*Attorney, Agent, or Firm*—Kenway & Jenney

[57] ABSTRACT

Distillation apparatus in which a group of heat-transfer tubes are each driven to wobble about a vertical axis which passes through a wobbling center. A stream of fluid is directed to flow down inside each tube. The fluid stream tends to cling to the inner surface of the tube away from the wobbling center while it revolves with respect to the tube in response to the wobbling motion. The revolving flow stream wipes the inside surface of the tube to form a thin film which offers low heat resistance to facilitate the evaporation, carries away the residue by its lateral motion and carries the reflux downward with little restriction.

9 Claims, 9 Drawing Figures

U.S. Patent  Oct. 28, 1980  Sheet 1 of 4  4,230,529
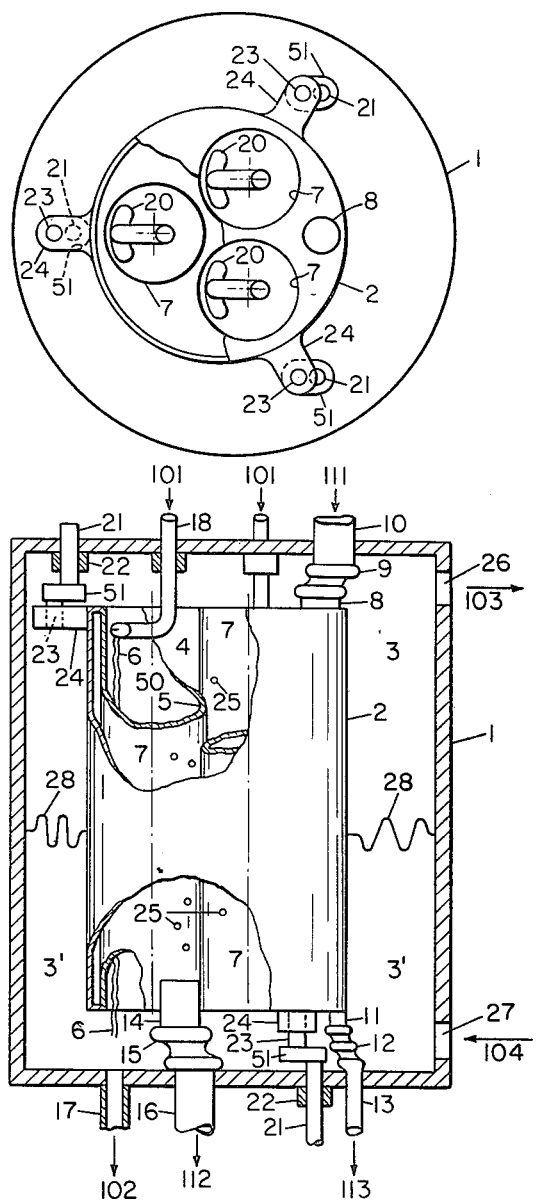
FIG. 1
FIG. 2
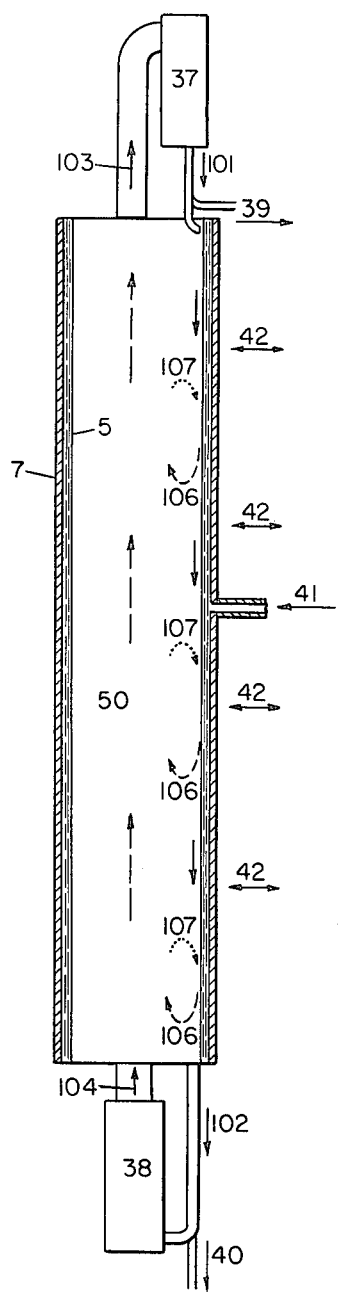
FIG. 7

DISTILLATION APPARATUS

BACKGROUND OF THE INVENTION

This invention is an improvement over the existing art for the evaporation or distillation of fluids. It may be used for concentration by removing part of the liquid (as in orange juice), for desalination by condensing the water vapor, or for distillation by separating the various ingredients in the fluid (as in alcohol and water). In all these applications the evaporation (or condensation) of the fluid occurs primarily at the interface between the liquid and its vapor while the needed energy is transmitted from a heat source through the container wall to the liquid and then through the liquid to the interface to support the evaporation.

The basic concept of distillation of sea water or other fluids, with or without vapor compression, is not new. However existing distillation systems require a substantial energy input to heat fluids and drive any compressors. Additionally, there is a substantial temperature gradient per stage which limits the number of stages usable with a given temperature rise or energy input and correspondingly limits the output.

It is an object of the present invention to reduce the power required and accordingly reduce the operating cost of the apparatus.

A further object is to lower the heat resistance of the fluid being evaporated and reduce temperature differentials.

A further object is to supply the energy needed to evaporate the fluid by the condensation of the evaporated vapor.

SUMMARY OF THE INVENTION

Novel distillation apparatus according to the present invention comprises wobbling thin-walled tubes to evaporate the fluid flowing inside the wobbling tubes with the heat energy supplied by condensing the stream of vapor which surrounds the outside surface of the tubes. The condensation that form droplets outside the tubes will be thrown off by the wobbling motion and splashed between the tubes to activate further condensation. Thus the wobbling motion of the tube, similar to the circular motion of tea inside a wobbling tea cup, effectively reduces the temperature difference between the vapor outside the tubes and the vapor inside the tubes. Consequently less energy or less equipment is needed for a given task than with conventional equipment. Vapor and fluid interconnecting appropriate to the desired distillation system are provided.

BRIEF DESCRIPTION OF THE DRAWINGS

The invention and its various features may be more fully understood from the following description in conjunction with the accompanying drawings in which:

FIG. 1 is an end plan view of a wobbling evaporator;

FIG. 2 is an elevation view, with cut out sections, of a wobbling evaporator,

FIG. 7 is a schematic elevation view of a distillation system.

DESCRIPTION OF PREFERRED EMBODIMENTS

Figure 3:
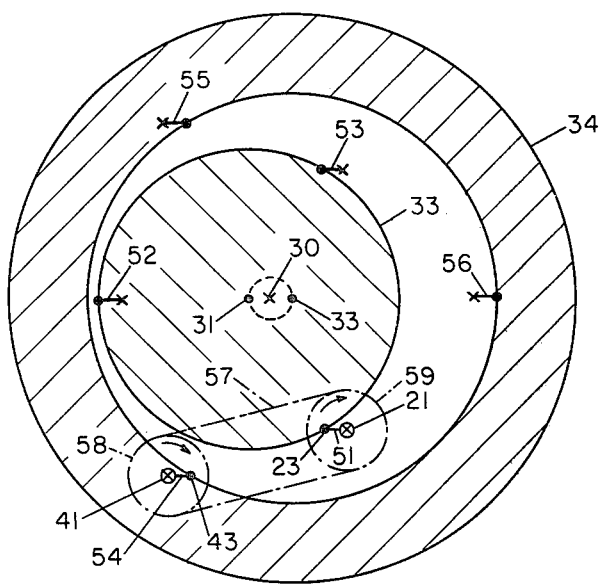
FIG. 3 is an end plan view of two concentric wobbling evaporators to achieve dynamic balancing.

FIG. 1 shows the end view of a generalized wobbling evaporator which consists of an outer shell 1 and a wobbling container 2. Three heat transfer tubes 7 are shown to perform the evaporation and condensation operation. In actual construction several dozens of tubes may be installed in one container.

Three brackets 24 are attached to the ends of the container 2. Three cranks 51 together with three sets of shafts 21 and 23 bearings 22 and 24 are used to guide the container 2 to revolve in the wobbling motion. A motor (not shown) may be used to drive any one of the three shafts 21 to wobble the container 2 as shown in the drawing container 2 is pivoted to arms 51 connected to shafts 21. Thus when any one or more of the three shafts 21 are rotated the pivot points 23 on container 2 travel through circles defined by the arms 51. The rotation of the points 23 through these small circles causes the container 2 to perform a wobbling motion.

Referring now to FIG. 2, fluid to be evaporated is represented by arrow 101 which flows into tube 18 which revolves in bushing 19. The center of bushing 19 is also the center of wobbling for tube 7. Thus, the wobbling motion of tube 7 will drive the "L" shaped pipe 18 to revolve in the bushing 19 and discharge the fluid from the head 20 at the far side of the tube 7 from the wobbling center.

The fluid discharge from head 20 becomes fluid stream 6 which revolves inside tube 7 and discharges into chamber 3' and then flows out through pipe 17 as represented by arrow 102.

Tube 7 wobbles but does not revolve. Thus the revolving stream 6 coats the inside surface of tube 7 with a thin film 5 which readily evaporates into vapor and escapes from the two ends of tube 7. The upper ends of tube 7 connect to chamber 3 and exit through opening 26 as arrow 103. Likewise, the lower end of tube 7 opens to chamber 3' and exits through opening 27 as arrow 104. Chambers 3 and 3' are separated by flexible barrier 28. In certain applications arrow 103 and arrow 104 may be arranged to have one flowing inward while the other is flowing outward to achieve continuous circulation and to help the evaporation. In some other cases the flexible barrier 28 is omitted so that only one exit is sufficient to bring the vapor out. The detailed arrangement of specific applications is discussed below.

High temperature vapor 111 will be introduced from inlet pipe 10 through flexible coupling 9 and pipe 8 into the inside chamber 4 of container 3. In contact with the coupler tube 7 the vapor will condense into droplets 25 which splashes inside chamber 4 against the outside surface of tubes 7 and thereby increases the condensation rate. Finally, the condensation will be collected near the bottom edge of chamber 4 and discharged through pipe 11, flexible coupling 12 and drain pipe 13 to become distillate 113. A second vapor passage 14-15-16 with vapor 112 is shown at the lower end of the system. This double ended vapor passage arrangement is needed in the distillation system described later in conjunction with FIG. 7 and is not essential for the desalination system described in conjunction with FIG. 6.

The wobbling drive of FIGS. 1 and 2 exhibits a revolving centrifugal force of the center of mass with respect to its wobbling center. FIG. 3 shows one way to balance the revolving forces by having two sets of concentric wobbling systems with the two mass centers 31 and 32 opposite to each other with respect to their common wobbling center 30. 31 is the mass center of the inner system 33 which is guided by three cranks 51, 52 and 53. 32 is the mass center of the outer system 34 and is guided by three cranks 54, 55 and 56. Both systems have the same wobbling center 30. Two gears 58 and 59 coupled by chain 57 are used to maintain the proper orientation of the two systems.

Figure 4:
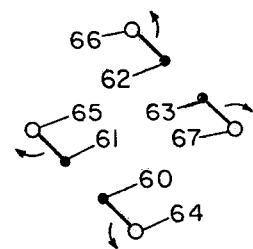
FIG. 4 is a schematic diagram of two pairs of wobbling systems to achieve dynamic balancing.

FIG. 4 shows schematically an arrangement wherein two pairs of wobbling systems are coupled together to achieve dynamic balancing. The four wobbling systems are symmetrical with each other and of the same mass. In the diagram mass centers 60, 61, 62 and 63 are shown to revolve with respect to the respective wobbling centers 64, 65, 66 and 67 and with orientation to provide dynamic balancing.

Figure 5:
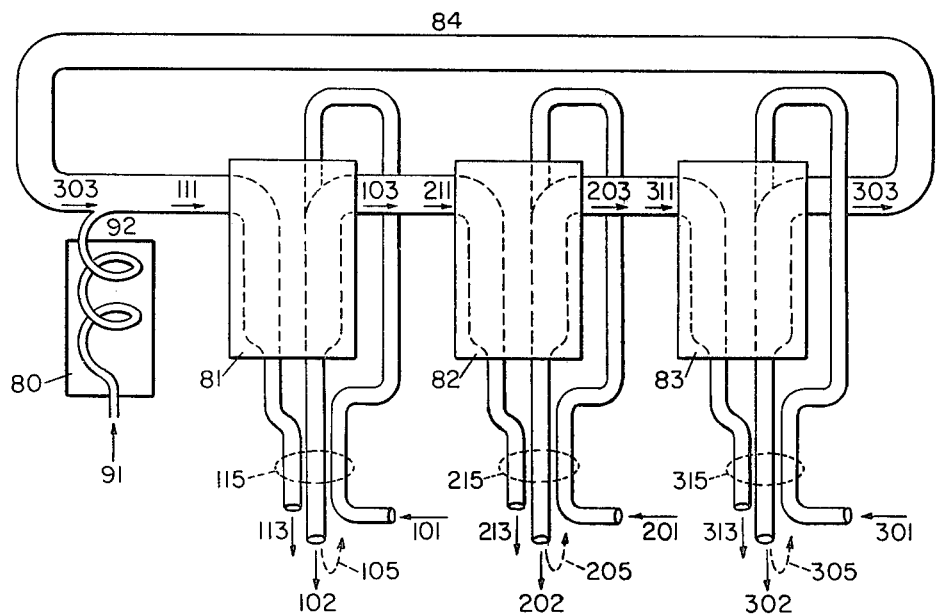
FIG. 5 is an elevation schematic view of cascading wobbling evaporators to be used as desalination system.

FIG. 5 shows the operation of a desalination system where vapor is to be evaporated from sea water and recondensed to get distilled water.

Heat energy is provided by a boiler 80 where high temperature steam 92 is generated from feed water 91. This high temperature steam is blended with low temperature vapor 303 to form vapor 111 which is to be condensed in a wobbling evaporator 81 which operates on the same principle as that shown in FIG. 2 but is here shown schematically. The condensate 113 of vapor 111 is channelled as part of of the desired output.

Sea water 101 is admitted to the wobbling evporator 81 to generate vapor 103. Excessive sea water is flushed out at 102. Heat exchanger arrangements as represented by 115, 215 and 315 are used to recover some of the heat energy in the condensate 113, 114 and 115 and exit flow 102, 202 and 302. Arrows 105, 205 and 305 are used to indicate that in some applications reflux of the sea water may be advisable to achieve higher operation efficiency.

Vapor 103 is directed to a second wobbling evaporator 82 to become input vapor 211 and condensed as distillate water 213. Sea water 201 is admitted to evaporator 82 in the same manner as sea water 101 is admitted to evaporator 81. The same operation, as illustrated for evaporator 81, is thus repeated in evaporator 82 and likewise in evaporator 83, as shown in FIG. 5. As a rule a certain temperature gradient exists between the condensing side and the evaporating side of each stage. For this reason vapor 303 is cooler than vapor 311 which is cooler than vapor 211 and in turn cooler than vapor 111. The total temperature drop across the series of evaporators is then rejuvenated by the boiler 80.

The distillation organization of FIG. 5 would also work if the wobbling evaporators are replaced by conventional condensor-evaporators. However the wobbling evaporator provides a lower temperature gradient per stage than that in conventional condensor-evaporators. There will be a similar gradient between the temperature needed to evaporate sea water and the temperature to condense the same vapor to distilled water in either system. But in addition to this the temperature gradient needed to transfer the heat will be different. For this reason for a given temperature rise or energy input provided by the boiler 80, more stages of wobbling evaporators can be accommodated and therefore more output in distilled water will be produced than with conventional condensor-evaporators.

Figure 6:
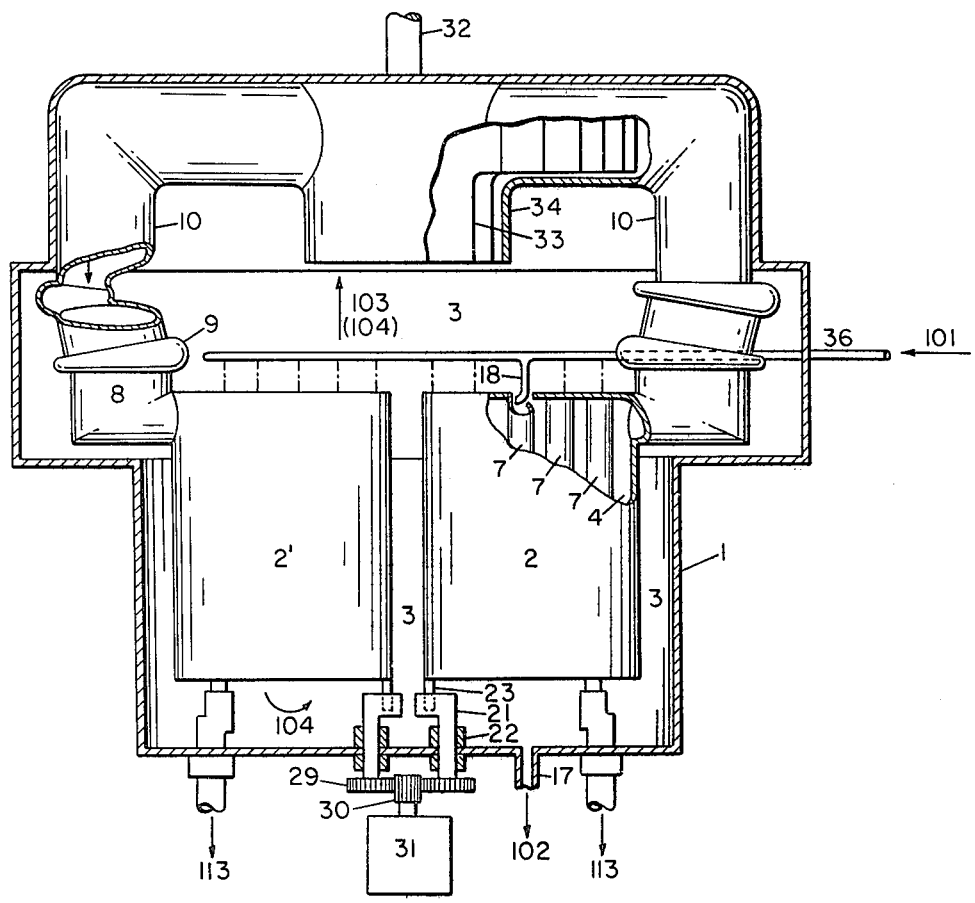
FIG. 6 is an elevation view, with cut out sections, of a vapor compression wobbling drive desalination system.

FIG. 6 shows a wobbling drive vapor compression evaporator where wobbling containers 2 and 2' are shown. These containers are driven to wobble by motor 31 through pinion 30, gear 29 and crank shaft 21 in the same way as in the apparatus of FIG. 2. Sea water 101 is distributed by piping system 36 to the various revolving pipes 18 to discharge into heat transfer tubes 7. Inside tube 7 the sea water will evaporate as vapor 103 or 104 and collect into chamber 3. A centrifugal compressor 33 driven by shaft 32 inside housing 34 will compress vapor 103 into vapor 111 which has a higher pressure and temperature than vapor 103. Vapor 111 is distributed by conduit system 10 flexible coupling 9 and conduit 8 to the inside chamber 4 and 4' of container 2 and 2'. Vapor 111 will be cooled and condensed by tubes 7 with the heat of condensation transmitted through the wall of tube 7 to evaporate sea water inside tube 7 in the same manner as illustrated before for the apparatus of FIG. 2.

The use of the wobbling drive system reduces the temperature gradient and the pressure gradient between the vapors across the heat transfer barriers. The net result is a reduction of the power needed to drive the centrifugal compressor 33 and therefore reduced operating cost of the plant.

FIG. 7 illustrates the general concept of a distillation column for separating two ingredients I and II soluble with each other. In this system fluid film 5 flows downward and a vapor 50 flows upward inside tube 7. The fluid film 5 will start with fluid input 101 at the top and become fluid output 102 at the bottom of the tube 7. The consistency of fluid 101 is strong in ingredient I whereas the consistency of fluid 102 is strong in ingredient II. Both ingredients are mutually soluble like alcohol and water. Likewise vapor 103 is strong in ingredient I and vapor 104 is strong in ingredient II. Along the counter flow paths of the fluid film 5 and vapor in chamber 50 molecules of ingredient I and II exchange across the vapor-liquid interface such that ingredient I is evaporated along the entire length of the tube 7, as represented by arrows 106; and ingredient II are condensed as represented by arrows 107. To support the energy balance, energy 42 is brought either in or out as needed along the length of the column.

Heat exchanger 37 is used to condense the vapor 103 to become fluid 101 whereas heat exchanger 38 is used to evaporate fluid 102 to become vapor 104 and thus close the loop.

Inlet 41 brings in fluid with intermediate consistency in ingredient I and II whereas outlet 39 extracts fluid strong in ingredient I and outlet 40 extracts fluid strong in ingredient II.

Figure 8:
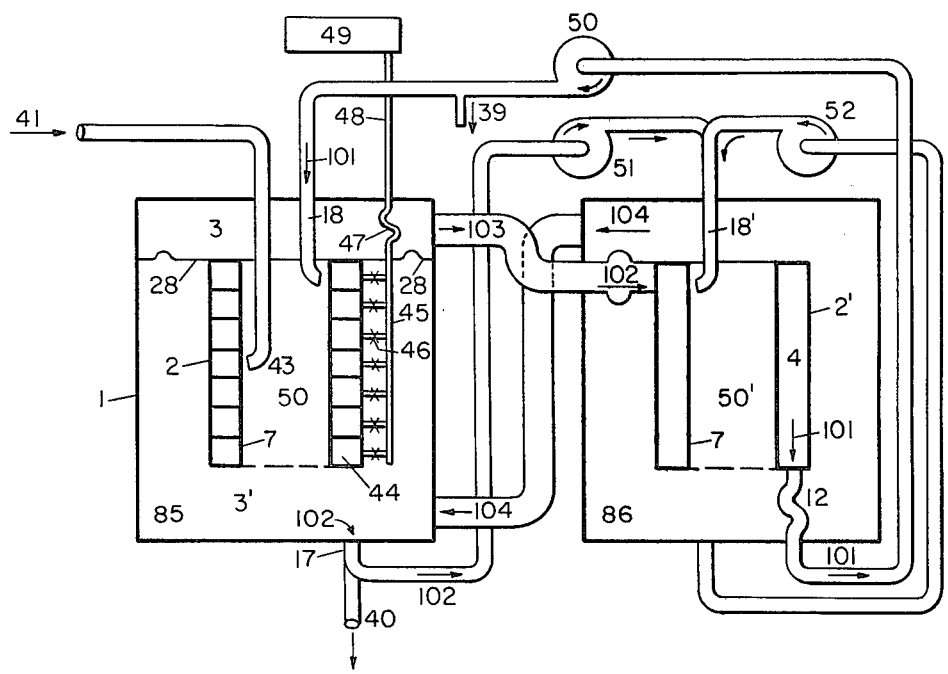
FIG. 8 is an elevation schematic view of two wobbling systems used as a distillation system.

The general concept of the distillation column of FIG. 7 is modified in FIG. 8 with the use of two wobbling evaporators—one for the distillation column and one to replace the condensor 37 and evaporator 38. On the left hand side of FIG. 8 the wobbling evaporator 85 is used as the distillation column whereas on the right hand side 86 is used as the dual purpose heat exchanger. In both cases the wobbling drive system is not shown and only one tube 7 and 7' is shown schematically for each system.

For the distillation column the inside column of case 1 is divided into chambers 3 and 3' by flexible barrier 28. Outside the heat transfer tube 7 the condensation chamber 4 of FIG. 2 is now replaced by a sequence of chambers 44. Valves 45 are used to couple chambers 44 with a steam main 45 to bring appropriate amount of energy into each chamber. The diagram is symbolic but shows the elements to be adjusted in accordance with the known characteristics of ingredients I and II utilized in fractionating column design.

The wobbling evaporator 86 is essentially the same as the evaporator of FIG. 2 with the exception that the flexible barrier 28 of FIG. 2 is not needed.

In operation the upper chamber 3 of evaporator 85 supplies vapor 103 which is condensed in chamber 4 of unit 86 to become fluid 101 which is pumped by pump 50 to return to unit 85 and be discharged through revolving tube 18 to coat the inside surface of tube 7. This fluid will be re-evaporated as vapor to fill the chamber 50 and to ascend to chamber 3 to complete the loop. Part of the fluid will flow down the inside surface of tube 7 to reach the lower chamber 3'.

Starting from chamber 3' of unit 85 fluid 102 will be drained from tube 17 and moved by pump 51 to reach the revoling tube 18' of unit 86 to coat the inside surface of tube 7'. The vapor thus generated will fill up chamber 50' and thus collect as vapor 104 to be transported back to chamber 3' of unit 85. Part of the vapor will be condensed into the inside surface of tube 7 and flow down back to chamber 3' and part of the vapor will ascend to chamber 3. Inlet 41 represents an influx of a fluid with intermediate consistency in ingredients I and II. Spray head 43 represents a disc shaped spray head to distribute the fluid evenly to the inside surface of tube 7.

Figure 9:
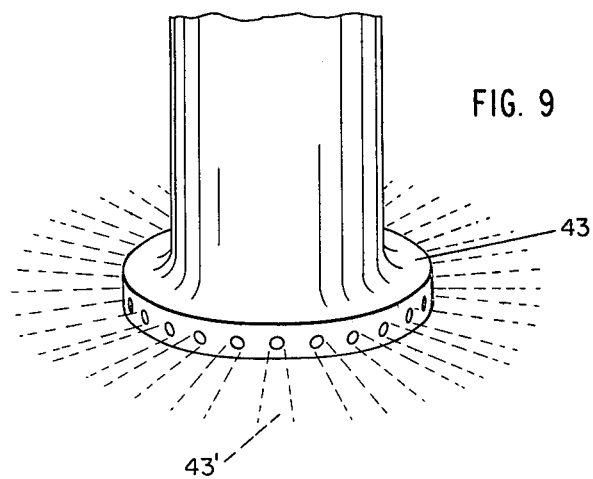
FIG. 9 is a perspective view of a disc-shaped spray head.

Disc shaped spray head 43 and the disc shaped spray 43' as shown in FIG. 9 may be used as an alternate to the revolving tube 18 for distributing the fluid. Tube 18 discharges fluid at the head of the revolving stream 6 of FIG. 2. In so doing it minimizes splashes and thereby avoids the mixing of the salt water mists with the cleam vapor. For distillation operation the spray head 43 used at the middle of the tube offers a simpler mechanical configuration where the mist forming is not objectionable. Pipes 39 and 40 represent the outlets of the fluids which are rich in ingredients I and II respectively.

Pump 52 and the associated pipe-line represent the auxiliary circulation loop of the fluid to be evaporated. An auxiliary fan or a pressurized fan may be needed to circulate the vapor 103 inside the condensing chamber 4.

Although certain preferred embodiments have been described, those skilled in the distillation and evaporation art will recognize that appropriate modifications may be made to meet specific applications without departing from the scope of my invention.

Having thus described my invention I claim:

1. Distillation apparatus comprising one or more heat transfer tube, each of the said one or more tubes aligned about a vertical axis, means to drive said heat transfer tubes about a wobbling center on said vertical axis without rotating the transfer tubes, means to direct a stream of fluid toward the inner surface of each of said tubes, the wobble motion imparted to each of said tubes serving to cause said fluid stream to cling to the inner surface of the tube away from the wobbling center whereby the resultant revolving flow stream serves to wipe the inside surface of the tube to form a thin film with low heat resistance and thus to facilitate evaporation and carry the residue and reflux downward with low resistance.

2. Apparatus according to claim 1 wherein fluid to be evaporated is introduced into said tubes and vapor evaporated from the fluid inside said tubes is introduced into the space surrounding the outside of said tubes, said vapor condensing upon the outer surfaces of said tubes.

3. Apparatus according to claim 1 having two sets of concentric wobbling tubes, each set having a mass center, the mass centers being opposite to each other with respect to a common wobbling center.

4. Apparatus according to claim 3 in which two pairs of wobbling systems are coupled together in dynamic balance.

5. Apparatus according to claim 2 wherein part of the effluent from the inside of the wobbling tubes is refluxed into the tubes to achieve higher operating efficiency.

6. Apparatus according to claim 2 wherein the vapor from the inside of the wobbling tubes is compressed before being discharged into the space surrounding the wobbling tubes.

7. Apparatus according to claim 2 for separating two ingredients soluble with each other and having different vaporization temperatures in which one wobbling tube distillation apparatus is used as a distillation column to vaporize the ingredient with lower temperature vaporization and concentrate the ingredient with higher temperature vaporization and another wobbling tube distillation apparatus is used in interconnection therewith to condense and reflux vapor from the apparatus serving as the distillation column and to evaporate and reflux fluid from the apparatus serving as the distillation column.

8. Apparatus according to claim 1 wherein the input fluid is introduced to the inside of the wobbling tubes by a revolving inlet pipe which distributes the fluid around the inside perimeter of the wobbling tube.

9. Apparatus according to claim 1 wherein the input fluid is introduced to the wobbling tube through a disc-shaped spreading head which distributes the fluid around the inside perimeter of the wobbling tube.

* * * * *